United States Patent [19]

Kim et al.

[11] Patent Number: 5,530,485
[45] Date of Patent: Jun. 25, 1996

[54] CHANNEL EQUALIZER FOR A HIGH DEFINITION TELEVISION

[75] Inventors: Myung S. Kim, Seoul; Hee B. Park, Kyungki-do, both of Rep. of Korea

[73] Assignee: LG Electronics Co., Ltd., Seoul, Rep. of Korea

[21] Appl. No.: 371,709

[22] Filed: Jan. 13, 1995

[30] Foreign Application Priority Data

Apr. 12, 1994 [KR] Rep. of Korea .................. 94-7638

[51] Int. Cl.$^6$ ...................................... H04N 5/21
[52] U.S. Cl. ................... 348/611; 375/231; 364/724.20
[58] Field of Search ................... 348/611, 614; 375/230, 231; 364/724.02, 724.19, 724.20; H04N 5/21

[56] References Cited

U.S. PATENT DOCUMENTS

| | | | |
|---|---|---|---|
| 5,117,291 | 5/1992 | Fadavi-Ardekani et al. | 375/231 |
| 5,204,878 | 4/1993 | Larsson | 375/14 |
| 5,247,541 | 9/1993 | Nakai | 375/14 |
| 5,283,811 | 2/1994 | Chennakeshu et al. | 375/14 |
| 5,297,166 | 3/1994 | Batruni | 375/14 |
| 5,319,585 | 6/1994 | Amrany | 364/724.19 |
| 5,331,416 | 1/1994 | Patel et al. | 348/614 |
| 5,345,274 | 9/1994 | Matsunaga | 348/614 |
| 5,363,144 | 11/1994 | Park | 348/614 |

FOREIGN PATENT DOCUMENTS

| | | | |
|---|---|---|---|
| 0373677 | 3/1991 | Japan | H04N 5/21 |
| 6225183 | 8/1994 | Japan | H04N 5/21 |

Primary Examiner—Safet Metjahic
Assistant Examiner—Jeffrey S. Murrell
Attorney, Agent, or Firm—Finnegan, Henderson, Farabow, Garrett & Dunner

[57] ABSTRACT

A channel equalizer for a high definition television that enhances the convergent speed of the channel equalizer by renewing first a filter coefficient of a near ghost image and then renewing a filter coefficient of a far ghost image, after distinguishing the filter coefficient corresponding to the near ghost image from the filter coefficient corresponding to the far ghost image. The equalizer comprises a finite impulse response filter for performing channel equalization on an input signal input from outside of the channel equalizer, the finite impulse response filter uses a previous filter coefficient corresponding to a near ghost image and a previous filter coefficient corresponding to a far ghost image to determine an output signal, and a filter coefficient renewal part for sequentially computing a present filter coefficient corresponding to a near ghost and a present filter coefficient corresponding to a far ghost using the output signal from the finite impulse response filter and a training sequence signal input from outside of the channel equalizer and for outputting the previous filter coefficient corresponding to the near ghost image and the previous filter coefficient corresponding to the far ghost image.

8 Claims, 3 Drawing Sheets

CHANNEL EQUALIZER FOR A HIGH DEFINITION TELEVISION

BACKGROUND OF THE INVENTION

1. Field of the Invention

The present invention relates to a channel equalizer that performs channel equalization by determining filter coefficients corresponding to near and far ghost images, and by dividing the near ghost images and far ghost images in a vestigial side band (VSB) transmission system of a high definition television (HDTV).

2. Description of the Related Art

A VSB transmission system transmits a training sequence signal from a transmitting part to a receiving part prior to transmitting a data signal in order to compensate in the receiving part for an error that may occur when the data is transmitted from the transmitting part through a transmission channel.

A channel equalizer is used in the receiving part of the VSB transmission system for compensating for linear channel distortion such as tilts or ghost images generated when signals pass from the transmission channel to the receiver and for transmitting data from the transmitting terminal to the receiving terminal. The channel equalization acts as a filter to reduce channel distortion generated during transmission.

Most important in channel equalization is how to calculate a filter coefficient. One method for channel equalization calculates a filter coefficient by using the training sequence signal transmitted from the transmitting terminal.

FIG. 1 is a block diagram of a conventional channel equalizer. The conventional channel equalizer includes a filter coefficient renewal part 12 which takes as input data, $V_n$ and a filtered signal $I_n$ received from outside of the channel equalizer and outputs a filter coefficient $C_n$. A finite impulses response filter (FIR) 11 filters the input signal $V_n$ received from outside of the channel equalizer by means of the filter coefficient $C_n$, output by the filter coefficient renewal part 12, and then outputs the filtered signal In.

The FIR filter 11 that has 256 taps formed of filter coefficients $C_0$ to $C_{255}$, filters the input signal $V_n$ by combining linearly the present input signal and the previous input values. The input signal $V_n$ is filtered in response to filter coefficients $C_0$ to $C_{255}$, sequentially inputted from the filter coefficient renewal part 12.

The filter coefficient renewal part 12 determines the filter coefficient $C_n$, using the received input signal $V_n$ and the filtered signal $I_n$, output by the FIR filter 11.

The conventional channel equalizer feeds back the output signal $I_n$ of the channel equalizer to the filter coefficient renewal part 12, which then calculates the filter coefficient $C_n$, using the signal $I_n$ and the signal $V_n$. Channel equalization is performed by renewing the filter coefficient $C_n$ from $C_0$ to $C_{255}$ according to the number of taps.

The least mean square (LMS) algorithm is expressed by the following formula (1):

$$C_{n+1}=C_n+\Delta E_n V_{n-k} \qquad (1)$$

$C_n$, $C_{n+1}$, $\Delta$, and $E_n$ designate, respectively, a previous filter coefficient, a filer coefficient that is now to be obtained, a constant, and a value of error.

The value of error is $R_2-I_n$ in the case of a blind channel equalizer, and is otherwise a value $I_T-I_n$, where $I_n$ is the output of the channel equalizer and $I_T$ is the training sequence signal.

$V_{n-k}$ is a value of the input of the channel equalizer and becomes $I_T$ if the channel equalizer is using the training sequence signal as input. Accordingly, the filter coefficient is expressed as:

$$C_{n+1}=C_n+\Delta(I_n-I_n) I_T \qquad (2)$$

FIG. 2 is a detailed circuit diagram of the filter coefficient renewal part 12 of FIG. 1.

The filter coefficient renewal part 12 comprises a slicer 12-1 which converts the filtered signal $I_n$, output by the FIR filter 11, to a predetermined transmission level; an adder 12-2 which calculates the difference between the signal from the slicer 12-1 and the filtered signal $I_n$, received from the FIR filter 11, and outputs the difference as a value of error; a multiplier 12-3 which multiplies the output value of error by a constant $\Delta$; an adder 12-4 which adds the signal output by the multiplier 12-3 and the previous filter coefficient to find a new filter coefficient $C_{n+1}$.

The conventional filter coefficient renewal part 12 converts the signal $I_n$, output by the channel equalizer, into a predetermined transmission level through the slicer 12-1, and determines the difference between the output signal of the slicer 12-1 and the output signal $I_n$ of the channel equalizer. The filter coefficient renewal part 12 outputs this difference as a value of error.

The value of error output is multiplied by a constant $\Delta$, between 0 and 1, and the reduced value of error is added to the previous filter coefficient $C_n$ in the adder 12-4 and is output to the FIR filter 11 as a new filter coefficient $C_{n+1}$.

Accordingly, the FIR filter 11 performs the channel equalization using the filter coefficient $C_{n+1}$ received from the filter coefficient renewal part 12. In the channel equalization, the convergent speed is the most important factor, when using the LMS algorithm. The convergent speed of the channel equalizer depends on how rapidly the filter coefficient is renewed. Since the conventional channel equalizer sequentially computes all the filter coefficient up to the number of taps of the filter coefficient, the channel equalizer takes a long time to converge.

SUMMARY OF THE INVENTION

The present invention provides a solution to the above problem and has as an object the provision of a channel equalizer for a high definition television that enhances the convergent speed of the channel equalizer by first renewing a filter coefficient of a near ghost image and then renewing a filter coefficient of a far ghost image, after distinguishing the filter coefficient corresponding to the near ghost image from the filter coefficient corresponding to the far ghost image.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims To achieve the objects and in accordance with the purpose of the invention, as embodied and broadly described herein, the channel equalizer for a high definition television of the present invention comprises a finite impulse response filter for performing channel equalization on an input signal input from outside of the channel equalizer. The finite impulse response filter uses a previous filter coefficient corresponding to a near ghost image and a previous filter coefficient corresponding to a far ghost image to determine an output signal. A filter coefficient renewal part sequentially computes a present filter coefficient corresponding to a near ghost and a present filter coefficient corresponding to a far ghost, using the output signal from the finite impulse response filter and a training sequence signal input from outside of the channel equalizer and then outputs the previous filter coefficient corresponding to the near ghost image and the previous filter coefficient corresponding to the far ghost image.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE INVENTION

Figure 1:
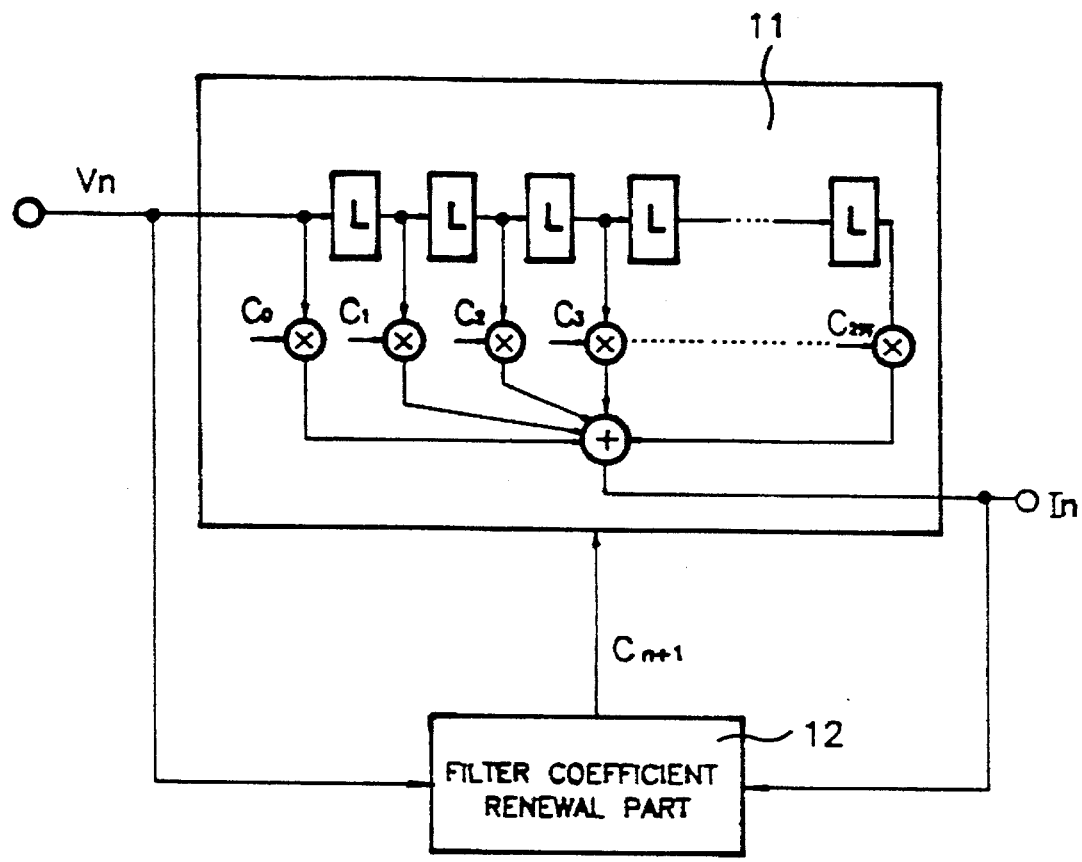
FIG. 1 is a block diagram of a conventional channel equalizer.
Figure 2:
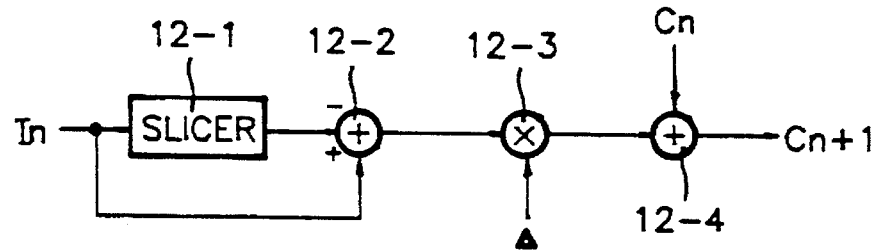
FIG. 2 is a circuit diagram of the filter coefficient renewal part of FIG. 1.
Figure 3:
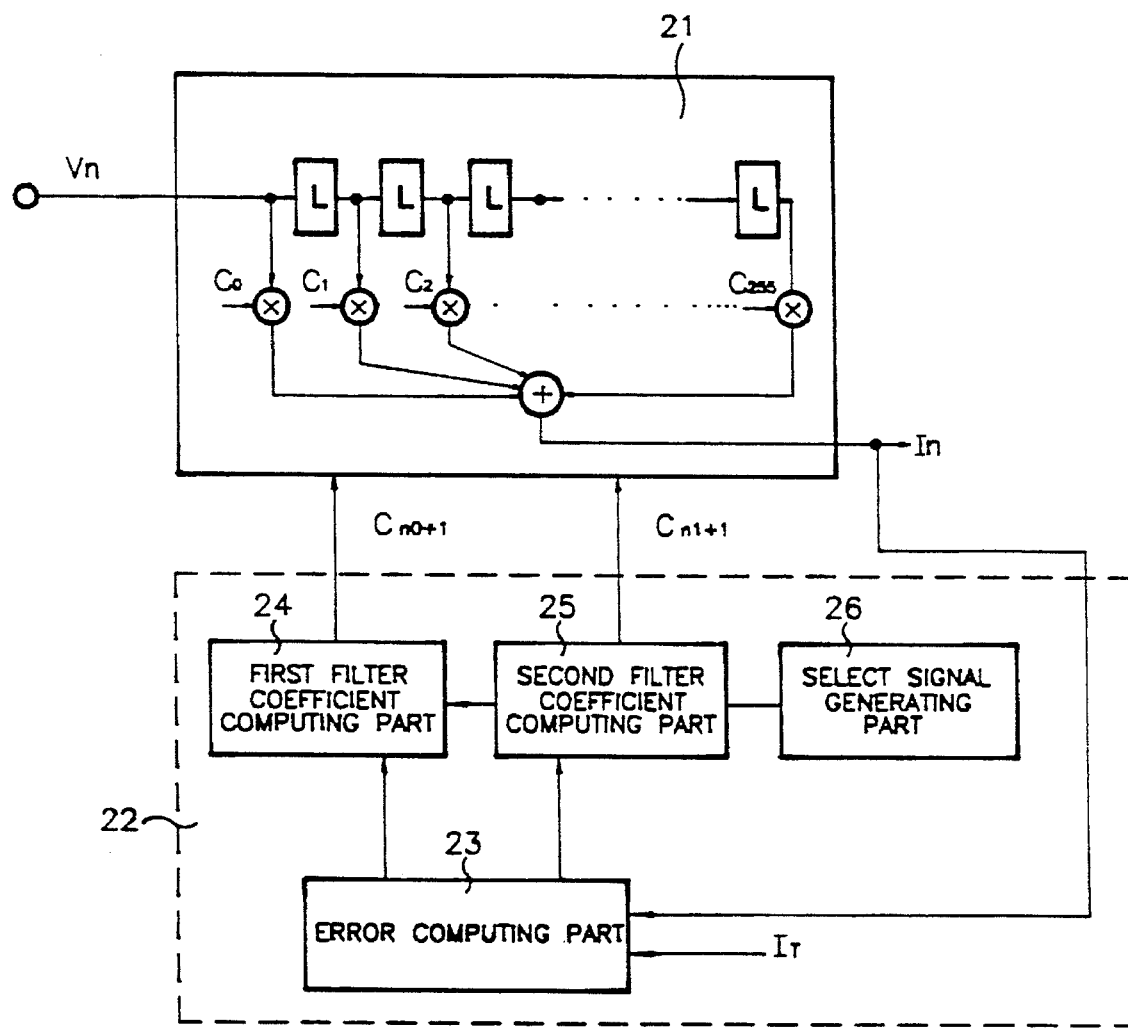
FIG. 3 is a block diagram of a channel equalizer according to the present invention.

As shown in FIG. 3, an equalizer of the present invention includes a finite impulse response (FIR) filter 21 and a filter coefficient renewal part 22.

Using a filter coefficient $C_{no+1}$ corresponding to a near ghost image determined by the filter coefficient renewal part 22, and a filter coefficient $C_{nl+1}$ corresponding to a far ghost image, the FIR filter 21 equalizes the channel of an input signal $V_n$ and outputs signal $I_n$.

The filter coefficient renewal part 22 includes an error computing part 23 that determines a value of error using the signal $I_n$ output by the FIR. filter 21 and the training sequence signal $I_T$ received from outside of the equalizer; a first filter coefficient computing part 24 that computes a filter coefficient $C_{no+1}$ corresponding to a near ghost image using a signal output by the error computing part 23 and then outputs the filter coefficient to the FIR filter 21; a select signal generating part 26 outputs a select signal SE after the first filter coefficient computing part 24 has completed its operation as to a large ghost image or a far ghost image; and a second filter coefficient computing part 25 that computes a filter coefficient $C_{nl+1}$ corresponding to the far ghost image, in response to the select signal SE output by the select signal generating part 26, by using the signal output by the error computing part 23 and then outputs the filter coefficient $C_{nl+1}$ to the FIR filter 21.

The filter coefficient renewal part 22 computes, sequentially, the filter coefficient $C_{no+1}$ as to the near ghost image and the filter coefficient $C_{nl+1}$ as to the far image ghost image using the signal $I_n$ output by the FIR filter 21 and the training sequence signal $I_T$ received from outside of the equalizer, and outputs the filter coefficients to the FIR filter 21.

A ghost image is an afterimage that results from a reflection of an obstacle during the transmission of the signal, and during transmission of the signal, the ghost image that results from a delay of the primary signal has a great effect on the restoring of the primary signal through the channel equalizer.

Figure 5:
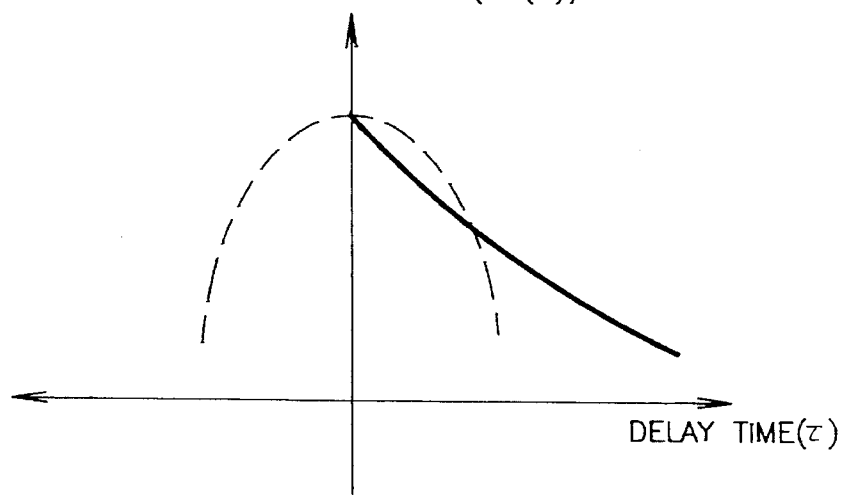
FIG. 5 is a graph showing the relationship between the size of ghost images and the delay time.

FIG. 5 shows the relationship between the size of the ghost image and the delay time. Long delay time is a ghost image reflected from a long distance and short delay time is a ghost reflected from a short distance. The ghost image of a long delay time is larger than the ghost image of the short delay time.

If a middle tap of the FIR filter is $C_{20}$, $C_0$ to $C_{19}$ are filter coefficients used to remove any pre-ghost image that exists prior to the delay time, and $C_{21}$ to $C_{255}$ are filter coefficients used to remove any post-ghost image that exists after the primary time.

The coefficients near the middle tap $C_{20}$, are coefficients that are used to remove a near ghost, and coefficients far from the middle tap $C_{20}$ are coefficients that are used to remove a far ghost. The object of the channel equalizer is to remove the ghost, and to reduce the convergent time requires to remove the ghost image.

Since the near ghost image is larger than the far ghost image, in the present invention, and most of the ghost images are near ghost images, the near ghost images are separated from the far ghost images. After the near ghost image, which includes several frequencies, has been equalized, the far ghost image is then processed in order to enhance the convergent speed.

The process of the channel equalization is described with reference to FIG. 3. When the outside input signal $V_n$ is received by the channel equalizer, the FIR filter 21 filters the input signal $V_n$ to produce the output signal $I_n$. The output signal $I_n$ produced from the FIR filter 21 is output to the filter coefficient renewal part 22 and used for renewal of the filter coefficient.

A filter coefficient $C_{no+1}$ corresponding to the near ghost image, output by the first filter coefficient computing part 24, is input into the FIR filter 21 as one of the output signals of the filter coeffecient renewal part 22, and the FIR filter 21 filters the received input signal $V_n$ according to the filter coefficient $C_{no+1}$ and performs the channel equalization as to the near ghost image.

After the channel equalization as to the near ghost image, the filter coeffecient $C_{nl+1}$ corresponding to the far ghost image output by the second filter coeffecient computing part 25 is input into the FIR filter 21 as one of the output signals of the filter coeffecient renewal part 22. The FIR filter 21 filters the received input signal $V_n$ according to the filter coeffecient $C_{nl+1}$ and performs the channel equalization as to the far ghost image.

The channel equalization as to the near ghost image having a large size is performed in advance, and the channel equalization as to the far ghost image is then performed whereby the channel equalization converges in a short period of time.

If the far ghost image is large compared to a reference size, the select signal generating part 26 produces the select signal SE for selecting the second filter coefficient computing part 25. The second filter coefficient computing part 25 outputs the filter coefficient $C_{nl+1}$ as to the far ghost image, and the FIR filter 21 performs the channel equalization as to the far ghost image.

Figure 4:
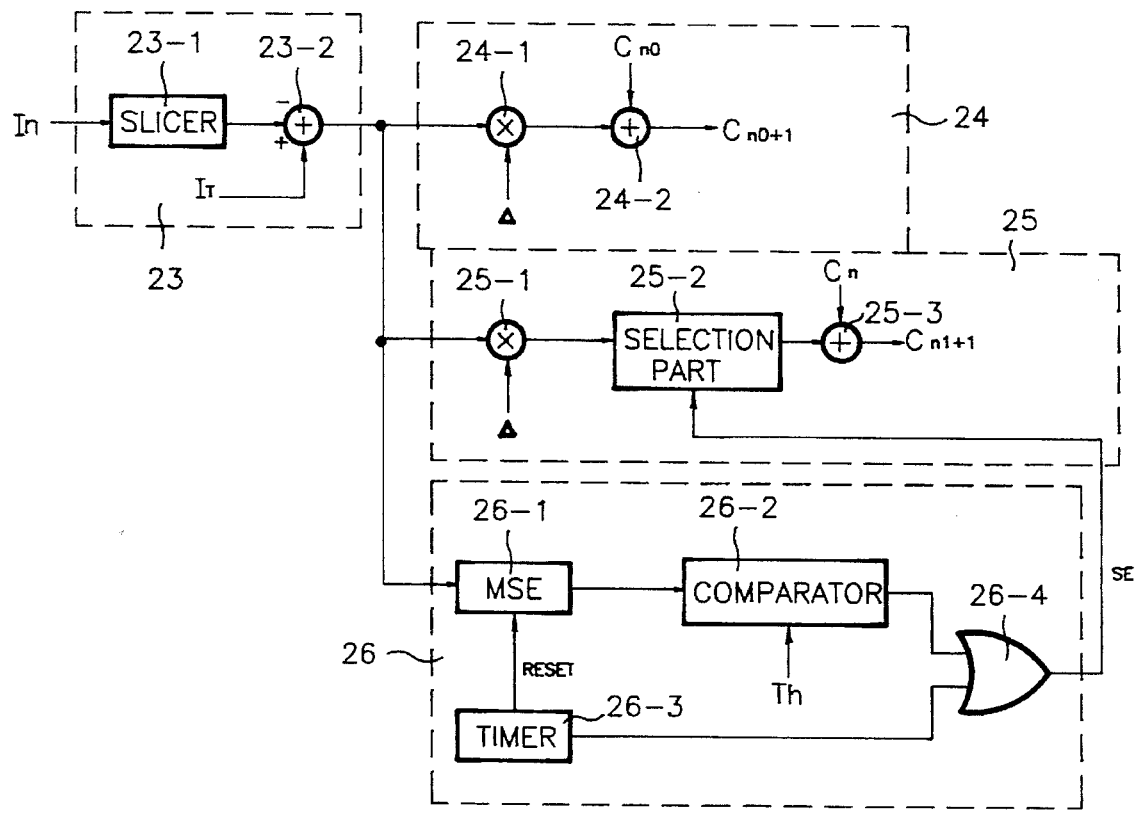
FIG. 4 is a circuit diagram of a filter coefficient renewal part of FIG. 3.

FIG. 4 is a detailed view of the filter coefficient renewal part 22 shown in FIG. 3.

The error computing part 23 includes a slicer 23-1 for converting the output signal $I_n$ output by the FIR filter 21 and an adder 23-2 for determining the difference between the signal output by the slicer 23-1 and the training sequence signal $I_T$ received from outside of the equalizer and then outputting the difference as a value of error.

The first filter coefficient computing part 24 includes a multiplier 24-1 for multiplying a signal output by the error computing part 23 by a constant $\Delta$, and an adder 24-2 for adding the signal output by the multiplier 24-1 and the previous filter coefficient $C_{no}$ as to the near ghost image and for outputting the present filter coefficient $C_{no+1}$ corresponding to the near ghost image.

The constant $\Delta$ is greater than "0" and less than "1", and reduces the value of error output by the error computing part 23. The second filter coefficient computing part 25 includes a multiplier 25-1 for multiplying the signal output by the error computing part 23 by a constant $\Delta$, a selecting part 25-2 for selecting a signal output by the multiplier 25-1 in response to the select signal SE output by the select signal generating part 26, and an adder for adding the previous filter coefficient $C_{nl+1}$ to the signal produced from the selecting part 25-2 and the previous filter coefficient $C_{nl+1}$ to produce the present filter coefficient $C_{nl+1}$ as to the far ghost image.

The constant $\Delta$ is greater than "0" and less than "1", and reduces the error value output by the error computing part 23. The select signal generating part 26 includes a mean square error MSE computing part 26-1 for determining a mean square error for a predetermined period of time using a signal produced from the error computing part 23 as an input signal; a timer 26-3 for generating a reset signal to reset the MSE computing part 26-1 after the operation of the first filter coefficient computing part 24; a comparator 26-2 for comparing the signal produced from the MSE computing part 26-1 with a predetermined critical value Th; and an OR gate 26-4 for taking a signal produced from the comparator 26-2 or a signal produced from the timer 26-3 and outputting as the select signal SE. The critical value Th is determined by experiment, and is a maximum value of error that allows for a proper transmission.

Referring now to FIG. 4, the performance of the channel equalization as to the near or far ghost image is described. When the input signal $V_n$ is input, the FIR filter 21 filters and produces the output signal $I_n$. The filter coefficient renewal part 22 determines a filter coefficient $C_{no+1}$ as to near ghosts by using the signal $I_n$. The error computing part 23 converts the signal $I_n$ into a predetermined transmitting level through the slicer 23-1 The adder 23-2 determines a difference between the signal $I_n$ converted to a predetermined transmitting level and the training sequence signal $I_T$ received from outside of the equalizer. The adder 23-2 outputs the difference of the two signals as a value of error. This value of error is input to the multiplier 24-1 of the first filter coefficient computing part 24 and is multiplied by a constant $\Delta$ to reduce the error value.

The output signal of the multiplier 24-1 is input to the adder 24-2, and the adder 24-2 adds a filter coefficient Cno as to the near ghost image that was previously determined to the output signal of the multiplier 24-1 resulting in the filter coefficient $C_{no+1}$ as to the present near ghost image for input into the FIR filter 21. If the total number of coefficients of the channel equalizer is 256, the number of $C_{no}$ filter coefficients is about 40 to 50, which is nearly the middle of the coefficients. The FIR filter 21 filters the input signal $I_n$ using the filter coefficient $C_{nO+1}$ and performs channel equalization as to the near ghost images.

When the channel equalization as to the near ghost images is performed and after a predetermined period of time, a reset signal is output by the timer 26-3 of the select signal generating part 26. This reset signal is sent to an OR gate 26-4 to output a select signal SE. This select signal SE is applied to the selecting part 25-2.

The error value output by the error computing part 23 is multiplied by a constant $\Delta$ through the multiplier 25-1. The selecting part 25-2 selects an output of the multiplier 25-1 according to the select signal SE output the select signal generating part 26. The signal output by the multiplier 25-1 is input into the adder 25-3.

The adder 25-3 adds the output signal of the multiplier 25-1 to the filter coefficient $C_n$ as to the far ghost images, and renews the filter coefficient $C_{n1+1}$ as to the far ghost images for output to the FIR filter 21.

The FIR filter 21 filters the input signal $I_n$ received from outside of the equalizer according to the filter coefficient $C_{n1+1}$ output by the adder 25-3 and performs the channel equalization as to the far ghost images.

The far ghost images may be large, and if the channel equalization is performed in the above way, the channel equalizer may not be converged. The select signal generating part 26 senses the occurrence of the far ghost images being large in size with a predetermined space, by using values output by the error computing part 23, and generates a select signal SE for selecting the second filter coefficient computing part 25 at the time of producing the far ghost images having a large size.

The value of error produced from the error computing part 23 at the time of performing the channel equalization as to the near ghost images, is applied to the MSE computing part 26-1 of the select signal generating part 26, and the MSE computing part 26-1 determines an average of the values of errors for a predetermined period of time for output to the comparator 26-2.

The comparator 26-2 compares this average with a critical value Th, and produces a certain signal if the average is larger than the critical value Th. This output signal and the timer 26-3 output signal are input to the OR gate 26-4 and a select signal SE is output. Generally, as the channel equalization as to the near ghost images is performed, the output value of the error computing part 23 must be reduced gradually.

Accordingly, the output value of the MSE computing part 26-1 is larger than the critical value Th, which means that the output value of the error computing part 23 is continuously increases. Therefore, the far ghost image has a large size and the near ghost image does not have a large size. Channel equalization as to the far ghost images should be performed instead of performing the channel equalization as to the near ghost images.

If the second filter coefficient computing part 25 is activated by the select signal SE, the output of the error computing part 23 is applied to the second filter coefficient computing part 25 to produce a filter coefficient $C_{n1+1}$ as to the large far ghost image for output to the FIR filter 21. The FIR filter 21 performs the channel equalization as to the far ghost images according to this filter coefficient $C_{n1+1}$.

In the present invention, the channel equalization as to the near ghost images is performed, the ghost images being divided into near and far ghost images, and the channel equalization as to far ghost images is then performed to enhance the convergent speed.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A channel equalizer for a high definition television comprising:

a finite impulse response filter for performing channel equalization on an input signal input from outside of the channel equalizer, said finite impulse response filter using a previous filter coefficient corresponding to a near ghost image and a previous filter coefficient corresponding to a far ghost image to determine an output signal; and a filter coefficient renewal part for sequentially computing a present filter coefficient corresponding to a near ghost image and a present filter coefficient corresponding to a far ghost image using said output signal from said finite impulse response filter and a training sequence signal input from outside of the channel equalizer and for outputting the previous filter coefficient corresponding to the near ghost image and the previous filter coefficient corresponding to the far ghost image;

the filter coefficient renewal part further including:

an error computing part for determining a value of error for the output signal from said finite impulse response filter and said training sequence signal;

a first filter coefficient computing part for computing the previous filter coefficient corresponding to the near ghost image using the value of error output by the error computing part and for outputting the previous filter coefficient corresponding to the near ghost image to said finite impulse response filter;

a select signal generating part for sensing if a far ghost image is larger than a reference size, and if the far ghost image is larger than the reference size, outputting a select signal after the first filter coeffecient computing part has output the previous filter coefficient corresponding to the near ghost image; and a second filter coefficient computing part for computing the previous filter coefficient corresponding to the far ghost image using the signal output by the error computing part in response to receiving the select signal, and outputting the previous filter coefficient corresponding to the far ghost image to the finite impulse response filter.

2. A channel equalizer according to claim 1, wherein said error computing part includes:

a slicer for converting a signal output by the finite impulse response filter; and an adder for determining a difference between the converted signal and the training sequence signal and for outputting the difference as a value of error.

3. A channel equalizer according to claim 1, wherein the first filter coefficient computing part includes:

a multiplier for multiplying a signal output by the error computing part by a constant to reduce a value of error; and an adder for adding the signal output by the multiplier and the previous filter coefficient corresponding to the near ghost image and for outputting the sum as the present filter coefficient corresponding to the near ghost image.

4. A channel equalizer according to claim 3, wherein said constant is larger than "0" and smaller than "1".

5. A channel equalizer according to claim 1, wherein said second filter coefficient computing part includes:

a multiplier for multiplying a signal output by the error computing part by a constant to reduce a value of error;

a selecting part for selecting a signal output by the multiplier in response to the select signal output by the select signal generating part; and an adder for adding the selected signal and the previous filter coefficient and for outputting the sum as the present filter coefficient corresponding to the far ghost image.

6. A channel equalizer according to claim 5, wherein said constant is larger than "0" and smaller than "1".

7. A channel equalizer according to claim 1, wherein the select signal generating part includes:

a mean square error computing part for determining a mean square error for a predetermined period of time using a signal output by the error computing part and for using a timer to generate a reset signal to reset the mean square error computing part after the previous filter coefficient corresponding to the near ghost is output by the first filter coefficient computing part;

a comparator for comparing the signal output by the mean square error computing part with a critical value; and an OR gate for outputting either a signal output by the comparator or a signal output by the timer as the select signal.

8. A method of performing channel equalization of a high definition television signal using a finite impulse response filter coupled to a filter coeffecient removal section, the method comprising the steps of:

performing channel equalization with the finite impulse response filter on an input signal input from outside of the channel equalizer, using a previous filter coefficient corresponding to a near ghost image and a previous filter coefficient corresponding to a far ghost image to determine an output signal; and sequentially computing with the filter coefficient renewal section a present filter coefficient corresponding to a near ghost image and a present filter coefficient corresponding to a far ghost image using said output signal from said finite impulse response filter and a training sequence signal input from outside of the channel equalizer and for outputting the previous filter coefficient corresponding to the near ghost image and the previous filter coefficient corresponding to the far ghost image;

the sequentially computing step further including the steps of:

(a) determining a value of error between the output signal and said training sequence signal;

(b) computing the previous filter coefficient corresponding to the near ghost image using the determined value of error and outputting the previous filter coefficient corresponding to the near ghost image to said finite impulse response filter;

(c) sensing if a far ghost image is larger than a reference size, and if the far ghost image is larger than the reference size, outputting a select signal after step (c) has output the previous filter coefficient corresponding to the near ghost image; and (d) computing the previous filter coefficient corresponding to the far ghost image using the determined value of error in response to receiving the select signal, and outputting the previous filter coefficient corresponding to the far ghost image to the finite impulse response filter.

* * * * *